| | | |
|---|---|---|
| | US006037396A | |

United States Patent [19]
Sawada

[11] Patent Number: 6,037,396
[45] Date of Patent: Mar. 14, 2000

[54] HOT-MELT INK

[75] Inventor: Hidemasa Sawada, Ama-gun, Japan

[73] Assignee: Brother Kogyo Kabushiki Kaisha, Nagoya, Japan

[21] Appl. No.: 09/046,615

[22] Filed: Mar. 24, 1998

[30] Foreign Application Priority Data

Mar. 27, 1997 [JP] Japan .................................. 9-075121
Mar. 27, 1997 [JP] Japan .................................. 9-075122

[51] Int. Cl.⁷ ............................ C08L 33/24; C08L 77/00; C08L 91/06; C08L 91/08; C08L 93/04
[52] U.S. Cl. ................ 524/231; 106/31.29; 106/31.3; 106/31.31; 106/31.41; 106/31.43; 523/160; 523/161; 524/230; 524/272; 524/275; 524/277; 524/377; 524/487
[58] Field of Search ............... 106/31.29, 31.3, 106/31.31, 31.41, 31.43; 523/160, 161; 524/230, 231, 232, 377, 487, 489, 275, 277, 370, 270, 271, 272; 347/99

[56] References Cited

U.S. PATENT DOCUMENTS

| | | | |
|---|---|---|---|
| 3,653,932 | 4/1972 | Berry et al. | 106/31.29 |
| 4,390,369 | 6/1983 | Merritt et al. | 106/31.3 |
| 4,659,383 | 4/1987 | Lin et al. | 523/160 |
| 4,820,346 | 4/1989 | Nowak | 523/160 |
| 4,870,118 | 9/1989 | Kinoshita et al. | 523/207 |
| 5,560,765 | 10/1996 | Sawada . | |
| 5,592,204 | 1/1997 | Lin et al. | 347/88 |

FOREIGN PATENT DOCUMENTS

| | | |
|---|---|---|
| 0-565-735-A1 | 10/1993 | European Pat. Off. . |
| 0-844-287-A1 | 5/1998 | European Pat. Off. . |
| 43-01-706-A1 | 7/1993 | Germany . |
| 58-108271 | 6/1983 | Japan . |
| 59-22973 | 2/1984 | Japan . |
| 61-83268 | 4/1986 | Japan . |
| 62-48774 | 3/1987 | Japan . |
| 62-112627 | 5/1987 | Japan . |
| 62-295973 | 12/1987 | Japan . |
| WO 96/15201 | 5/1996 | WIPO . |

*Primary Examiner*—Peter A. Szekely
*Attorney, Agent, or Firm*—Oliff & Berridge, PLC

[57] ABSTRACT

A hot-melt ink for ink-jet recording comprises C.I. Solvent Yellow 162 or C.I. Solvent Blue 70 used as a colorant; four components (a) to (d) used as a medium, where the component (a) is selected from an amide resin, a C5 type synthetic petroleum resin, a C9 type synthetic petroleum resin and a C5–C9 type synthetic petroleum resin, the component (b) is a resin selected from a rosin resin, a terpene resin and a terpene phenol resin, the component (c) is a wax selected from a paraffin wax, a ketone wax and a polyethylene oxide wax and the component (d) is a wax selected from a monoamide wax and a diamide wax; and an antioxidant.

26 Claims, No Drawings

HOT-MELT INK

BACKGROUND OF THE INVENTION

1. Field of the Invention

This invention relates to a hot-melt ink used in ink-jet recording apparatus. More particularly, it relates to a hot-melt ink used in ink-jet recording apparatus in which ink is heated to melt in a state of higher temperature than room temperature to make a record.

2. Description of the Related Art

As ink-jet recording systems, various systems are proposed, e.g., what is called an electric field control system, in which the direction of fly of continuously ejected ink is deflected by an electrostatic attraction force; what is called a drop on-demand system (or pressure pulse system), in which the pressure applied to ink chambers is controlled by utilizing the vibration of a piezoelectric device, to eject ink; and what is called a thermal ink-jet system, in which a pressure produced by bubbles formed and grown by locally heating ink in capillaries is utilized to eject ink. These systems can provide very highly precise printed images.

As inks used in these ink-jet recording systems, water-based inks employing water as a main solvent or oil-based inks employing an organic solvent as a main solvent are commonly used. Printed images obtained using the water-based inks have a poor water resistance in general. On the other hand, the use of oil-based inks can provide printed images having a good water resistance.

However, these water-based inks and oil-based inks are liquid at room temperature, and hence feathering tends to occur because ink rapidly permeates into a recording paper when images are printed on the recording paper, and that a sufficient print density has been achievable with difficulty. Also, because these inks are liquid, they tend to cause formation of deposits such as aggregates of dyes from inks during their storage, and such deposits have caused a great lowering of the reliability of ink-jet recording systems because of, e.g., clogging of nozzles.

Accordingly, in order to overcome such disadvantages of the conventional inks of a solution type, there is proposed a hot-melt ink-jet recording system making use of inks which are solid at room temperature and melt upon heating, and there are proposed various hot-melt inks used in the ink-jet recording system of this type.

For example, U.S. Pat. No. 3,653,932 discloses an ink containing a dialkyl sebacate. U.S. Pat. No. 4,390,369 and Japanese Patent Application Laid-open No. 58-108271 disclose an ink containing a natural wax. Japanese Patent Application Laid-open No. 59-22973 discloses an ink containing a stearic acid. Japanese Patent Application Laid-open No. 61-83268 discloses an ink containing an acid or alcohol having 20 to 24 carbon atoms and also containing a ketone having a relatively higher melting point than these. Japanese Patent Application Laid-open No. 62-48774 discloses an ink containing a thermosetting resin having a high hydroxyl value, a solid organic solvent having a melting point lower than 150° C. and a small quantity of a dye substance. Japanese Patent Application Laid-open No. 62-112627 discloses an ink comprised of a colorant, a first solvent which is solid at room temperature and capable of liquefying upon heating to a temperature higher than the room temperature and a second solvent capable of dissolving the first solvent, being liquid at room temperature and being highly volatile. Japanese Patent Application Laid-open No. 62-295973 discloses an ink containing a synthetic wax having a polar group and a dye soluble in the wax.

However, none of these conventional hot-melt inks well satisfy transparency of ink, color stability during storage, and good print quality such as recording density and hue. In particular, the poor dispersibility or solubility of dyes in main components of ink has a great influence on these properties or performances. Also, with the progress of office automation in recent years, there is an increasing demand for color presentation mediums such as color OHPs (overhead projectors). In order to meet such a demand, hot-melt inks are required to have a transparency for color reproduction of projected images, an adhesion to OHP films, and a heat resistance when used. However, hot-melt inks that can satisfy all of these requirements have not been available.

SUMMARY OF THE INVENTION

The present invention was made in order to solve the above problems involved in the prior art. Accordingly, an object of the present invention is to provide a hot-melt ink that has good storage stability and print quality, has superior transparency, adhesion and heat resistance which are adaptable also to printing on OHP sheets, and can form sharp colors most suited for the hot-melt ink-jet recording.

To achieve the above object, the present invention provides a hot-melt ink for ink-jet recording, comprising;

a colorant containing C.I. Solvent Yellow 162 or C.I. Solvent Blue 70;

a medium in which the colorant is dissolved or dispersed and which contains the following components (a) to (d):

(a) at least one resin selected from an amide resin, a C5 type synthetic petroleum resin, a C9 type synthetic petroleum resin and a C5–C9 type synthetic petroleum resin;

(b) at least one resin selected from a rosin resin, a terpene resin and a terpene phenol resin;

(c) at least one wax selected from a paraffin wax, a ketone wax and a polyethylene oxide wax; and (d) at least one wax selected from a monoamide wax and a diamide wax; and an antioxidant.

DETAILED DESCRIPTION OF THE INVENTION

The hot-melt ink of the present invention contains a colorant, a medium in which the colorant is dissolved or dispersed and which contains specific resins and waxes, and an antioxidant.

As the colorant used in the present invention, C.I. Solvent Yellow 162 or C.I. Solvent Blue 70 is used.

C.I. Solvent Yellow 162 is an oil-soluble dye and has a superior dispersibility or solubility in the above resins and waxes and a superior color-forming performance, being superior to those of other dyes, and hence can form an ideal yellow color when printed on plain paper.

As for C.I. Solvent Blue 70, it is also an oil-soluble dye and has a superior dispersibility or solubility in the above resins and waxes and a superior color-forming performance, being superior to those of other dyes, and hence can form an ideal cyan color when printed on plain paper.

The content of the dye C.I. Solvent Yellow 162 or C.I. Solvent Blue 70 used as the colorant (a recording agent) is determined depending on the types of the resins and waxes used as solvent components in which the recording agent is dispersed or dissolved and the properties such as color tone and image density required in ink, and may usually be within the range of from 0.1 to 15% by weight, preferably from 0.5 to 10% by weight, and more preferably from 1 to 5% by weight, based on the total weight of the ink. If it is in a content less than 1% by weight, a print density tends to become insufficient. If it is in a range more than 5% by weight, the freedom of selection of the solvent components tends to be narrow.

As the colorant, the above dye may be used alone, and besides the above dye and any other oil-soluble dye may be used in combination.

The medium (i.e., solvent components) which contain the dye as a solute will be described below.

In the present invention, the medium contains the following component-(a) resin, component-(b) resin, component-(c) wax and component-(d) wax.

Herein, the components-(c) and -(d) waxes are components in which the dye is dispersed or dissolved, and also determines the physical properties of the ink, such as thermal properties and viscosity. The components-(a) and -(b) resins ensure the adhesion of ink to printing paper, in particular, an always good adhesion to different printing mediums such as OHP film and plain paper, and simultaneously have the functions to control the viscosity of ink at the time of melting and to impart transparency to the ink by inhibiting the crystallization of wax. Thus, it is possible to provide a hot-melt ink that has a good print quality, has superior transparency, adhesion and heat resistance which are adaptable to printing on OHP sheets, and can form sharp colors most suited for the hot-melt ink-jet recording.

As the component (a), at least one resin selected from an amide resin, a C5 type synthetic petroleum resin, a C9 type synthetic petroleum resin, and a C5–C9 type synthetic petroleum resin is used. Of these, the C5–C9 type synthetic petroleum resin may preferably be used.

The component (a) has a weight-average molecular weight (Mw) of preferably from 500 to 500,000, more preferably from 600 to 400,000, much more preferably from 700 to 300,000, where a weight-average molecular weight (Mw) is obtained according to the gel-permeation chromatography or the programmed-temperature gas chromatography using a differential refractometer or a heat conductometer as a detector, respectively.

The component (a) may usually be used in a content of from 1 to 35% by weight, and preferably from 5 to 30% by weight, based on the total weight of the ink. If it is in a content less than 5% by weight, it may be less effectively done to control the viscosity of ink and also to impart transparency to the ink by inhibiting the crystallization of wax. If it is in a range more than 30% by weight, the ink may have too high a viscosity to be well ejected from ejection orifices of the ink-jet recording head.

As the component (b), at least one resin selected from a rosin resin, a terpene resin and a terpene phenol resin is used.

The component (b) has a weight-average molecular weight (Mw) of preferably from 500 to 500,000, more preferably from 600 to 400,000, much more preferably from 700 to 300,000, where a weight-average molecular weight (Mw) is obtained according to the gel-permeation chromatography or the programmed-temperature gas chromatography using a differential refractometer or a heat conductometer as a detector, respectively.

The component (b) may usually be used in a content of from 0.1 to 15% by weight, and preferably from 0.5 to 10% by weight, based on the total weight of the ink. If it is in a content less than 0.5% by weight, it may be less effectively done to improve the adhesion of ink to printed paper. If it is in a range more than 10% by weight, the ink may become so much tacky on the printed paper that the ink may transfer to another paper when second printed paper is overlaid on first printed paper.

As the component (c), at least one wax selected from a paraffin wax, a ketone wax and a polyethylene oxide wax is used.

The component (c) is stable to heat, having a melting point of perferably from 50 to 150° C., more preferably from 60 to 140° C., much more preferably from 70 to 130° C.

The component (c) may usually be used in a content of from 1 to 70% by weight, and preferably from 10 to 60% by weight, based on the total weight of the ink. If it is in a content less than 10% by weight, it follows that relatively the wax component is in a small quantity and the resin component is in a large quantity, so that the ink may melt in a broad temperature range to make it difficult to achieve sharp thermal properties of the ink. Hence, a problem may occur such that the ink hardens so slowly at the time of printing that the ink on paper after printing may transfer to other paper. Also, if it is in a content less than 10% by weight, the ink may have too high a viscosity to be well ejected from ejection orifices of the ink-jet recording head. If it is in a content more than 60% by weight, the ink may have so low a viscosity that problems such as feathering of ink on paper may occur to make it impossible to carry out good printing.

As the component (d), at least one wax selected from a monoamide wax and a diamide wax is used.

The component (d) is stable to heat, having a melting point of perferably from 50 to 150° C., more preferably from 60 to 140° C., much more preferably from 70 to 130° C.

The component (d) may usually be used in a content of from 0.5 to 40% by weight, and preferably from 5 to 30% by weight, based on the total weight of the ink. If it is in a content less than 5% by weight, the dye may poorly be dispersed or dissolved. If it is in a content more than 30% by weight, the ink may have a disagreeable smell, and also may have a higher melting point, resulting in an increase in the amount of heat for melting the ink to cause an increase in power consumption of the ink-jet recording head. Moreover, it may have so large an amine value as to have poor heat resistance, light-fastness and oxidation resistance.

The antioxidant may usually be used in a content of from 0.1 to 5% by weight, and preferably from 0.5 to 3% by weight, based on the total weight of the ink. If it is in a content less than 0.5% by weight, the ink may be less effectively prevented from being oxidized, i.e., less effectively prevented from changing in color. If it is in a content more than 3% by weight, it may cause a great change in thermal properties of the ink because of its high melting point, or any excess antioxidant may become deposited to the ink surface after printing as if the surface has a white powder on it, resulting in a poor color of the ink after printing.

The hot-melt ink of the present invention comprised of the above components as essential components can provide sharp and high-grade printed images with a high print density not only on plain paper but also on OHP sheets, and also have superior properties in respect of light-fastness and high-temperature storage stability. Additives such as an ultraviolet light absorbent, a plasticizer and a surface-active agent may also optionally be added.

EXAMPLES

The hot-melt ink (hereinafter often simply "ink") according to the present invention will be described below in greater detail by giving Examples as more preferred embodiments, in comparison with Comparative Examples.

In the description in the following Examples and Comparative Examples, "part(s)" refers to "part(s) by weight" in all occurrences. When an ink has such composition as to be 100 in total weight of the all components, the value of part(s) by weight of each component is equivalent to "% by weight" on the basis of the total weight of the ink.

Inks formulated in the following Examples 1 to 12 and Comparative Examples 1 to 11 are obtained by heating and dissolving each composition at a temperature of from about 70° C. to 250° C., and preferably from about 100° C. to 200° C. (in Examples and Comparative Examples, actual temperatures a little differ from one another depending on composition), and thoroughly stirring the resulting solution, followed by filtration with a 2 μm mesh filter by means of a heat filtering apparatus manufactured by Toyo Roshi K.K.

Example 1

As the amide resin, SUNMIDE 550 (trade name, available from Sanwa Chemical Industries Co., Ltd.) was used; as the terpene resin, CLEARON P115 (trade name, available from Yasuhara Chemical Co., Ltd.); as the ketone wax, T-1 (trade name, available from Kao Corporation); as the monoamide wax, NIKKAMIDE SE (trade name, available from Nippon Kasei Chemical Co., Ltd.); and as the antioxidant, IRGANOX 1010 (trade name, available from Ciba-Geigy Corp.).

Ink formulation was as follows:

| C.I. Solvent Yellow 162 | 1.5 parts |
|---|---|
| SUNMIDE 550 | 12 parts |
| CLEARON P115 | 5 parts |
| T-1 | 50 parts |
| NIKKAMIDE SE | 30 parts |
| IRGANOX 1010 | 1.5 parts |

Example 2

As the amide resin, BIRTHAMIDE 335 (trade name; available from Henkel Hakusui Corporation) was used; as the terpene resin, YS POLYSTAR T-115 (trade name, available from Yasuhara Chemical Co., Ltd.); as the ketone wax, WAX KM (trade name, available from Nippon Kasei Chemical Co., Ltd.); as the monoamide wax, NIKKAMIDE S (trade name, available from Nippon Kasei Chemical Co., Ltd.); and as the antioxidant, ADECASTAB AO-37 (trade name, available from Asahi Denka Kogyo K.K.).

Ink formulation was as follows:

| C.I. Solvent Yellow 162 | 1.5 parts |
|---|---|
| BIRTHAMIDE 335 | 22 parts |
| YS POLYSTAR T115 | 5 parts |
| WAX KM | 50 parts |
| NIKKAMIDE S | 20 parts |
| ADECASTAB AO-37 | 1.5 parts |

Example 3

As a C5–C9 type synthetic petroleum resin, ALCON P115 (trade name; available from Arakawa Chemical Industries, Ltd.) was used; as the terpene resin, YS POLYSTAR T100 (trade name, available from Yasuhara Chemical Co., Ltd.); as the ketone wax, STEARON (trade name, available from Kanto Chemical Co., Inc.); as the diamide wax, BISAMIDE S (trade name, available from Nippon Kasei Chemical Co., Ltd.); and as the antioxidant, SUMILIZER BHT (trade name, available from Sumitomo Chemical Co., Ltd.

Ink formulation was as follows:

| C.I. Solvent Yellow 162 | 1.5 parts |
|---|---|
| ALCON P115 | 22 parts |
| YS POLYSTAR T100 | 5 parts |
| STEARON | 52 parts |
| BISAMIDE | 18 parts |
| SUMILIZER BHT | 1.5 parts |

Example 4

As a C5–C9 type synthetic petroleum resin, ALCON P100 (trade name; available from Arakawa Chemical Industries, Ltd.) was used; as the terpene resin, YS POLYSTAR T100 (trade name, available from Yasuhara Chemical Co., Ltd.); as the paraffin wax, HNP-0190 (trade name, available from Nippon Seiro Co., Inc.); as the monoamide wax, NIKKAMIDE S (trade name, available from Nippon Kasei Chemical Co., Ltd.); and as the antioxidant, SUMILIZER BHT (trade name, available from Sumitomo Chemical Co., Ltd.

Ink formulation was as follows:

| C.I. Solvent Yellow 162 | 1.5 parts |
|---|---|
| ALCON P100 | 22 parts |
| YS POLYSTAR T100 | 5 parts |
| HNP-0190 | 45 parts |
| NIKKAMIDE S | 25 parts |
| SUMILIZER BHT | 1.5 parts |

Example 5

As a C5–C9 type synthetic petroleum resin, ALCON M90 (trade name; available from Arakawa Chemical Industries, Ltd.) was used; as the terpene resin, YS POLYSTAR 2115 (trade name, available from Yasuhara Chemical Co., Ltd.); as the paraffin wax, HNP-16B (trade name, available from Nippon Seiro Co., Inc.); as the monoamide wax, NIKKAMIDE S (trade name, available from Nippon Kasei Chemical Co., Ltd.); and as the antioxidant, ADECASTAB AO-37 (trade name, available from Asahi Denka Kogyo K.K.).

Ink formulation was as follows:

| C.I. Solvent Yellow 162 | 1.5 parts |
|---|---|
| ALCON M90 | 20 parts |
| YS POLYSTAR 2115 | 5 parts |
| HNP-16B | 47 parts |
| NIKKAMIDE S | 25 parts |
| ADECASTAB AO-37 | 1.5 parts |

Example 6

As a C5–C9 type synthetic petroleum resin, ALCON P115 (trade name; available from Arakawa Chemical Industries, Ltd.) was used; as the terpene resin, SR-30PX (trade name, available from Arakawa Chemical Industries, Ltd.); as the paraffin wax, PARAFFIN WAX 155 (trade name, available from Nippon Seiro Co., Inc.); as the monoamide wax, NIKKAMIDE S (trade name, available from Nippon Kasei Chemical Co., Ltd.); and as the antioxidant, ADECASTAB AO-37 (trade name, available from Asahi Denka Kogyo K.K.).

Ink formulation was as follows:

| C.I. Solvent Yellow 162 | 1.5 parts |
|---|---|
| ALCON P115 | 20 parts |
| SR-30PX | 5 parts |
| PARAFFIN WAX 155 | 52 parts |
| NIKKAMIDE S | 20 parts |
| ADECASTAB AO-37 | 1.5 parts |

Comparative Example 1

The antioxidant was removed from the formulation of Example 1. That is, ink formulation was as follows:

| C.I. Solvent Yellow 162 | 1.5 parts |
|---|---|
| SUNMIDE 550 | 12 parts |
| CLEARON P115 | 5 parts |
| T-1 | 50 parts |
| NIKKAMIDE SE | 31.5 parts |

Comparative Example 2

There was prepared the same composition as Example 2 except that C.I. Solvent Yellow 163 was used as the dye. That is, ink formulation was as follows:

| C.I. Solvent Yellow 163 | 1.5 parts |
|---|---|
| BIRTHAMIDE 335 | 22 parts |
| YS POLYSTAR T115 | 5 parts |
| WAX KM | 50 parts |
| NIKKAMIDE S | 20 parts |
| ADECASTAB AO-37 | 1.5 parts |

Comparative Example 3

There was prepaed the same composition as Example 3 except that C.I. Solvent Yellow 114 was used as the dye. That is, ink formulation was as follows:

| C.I. Solvent Yellow 114 | 1.5 parts |
|---|---|
| ALCON P115 | 22 parts |
| YS POLYSTAR T100 | 5 parts |
| STEARON | 52 parts |
| BISAMIDE | 18 parts |
| SUMILIZER BHT | 1.5 parts |

Comparative Example 4

There was prepared the same composition as Example 4 except that C.I. Solvent Yellow 77 was used as the dye. That is, ink formulation was as follows:

| C.I. Solvent Yellow 77 | 1.5 parts |
|---|---|
| ALCON P100 | 22 parts |
| YS POLYSTAR T100 | 5 parts |
| HNP-0190 | 45 parts |
| NIKKAMIDE S | 25 parts |
| SUMILIZER BHT | 1.5 parts |

Comparative Example 5

SUBNUDE 550 was removed from the formulation of Example 1. That is, ink formulation was as follows:

| C.I. Solvent Yellow 162 | 1.5 parts |
|---|---|
| CLEARON P115 | 17 parts |
| T-1 | 50 parts |
| NIKKAMIDE SE | 30 parts |
| IRGANOX 1010 | 1.5 parts |

Comparative Example 6

CLEARON P115 was removed from the formulation of Example 1. That is, ink formulation was as follows:

| C.I. Solvent Yellow 162 | 1.5 parts |
|---|---|
| SUNMIDE 550 | 17 parts |
| T-1 | 50 parts |
| NIKKAMIDE SE | 30 parts |
| IRGANOX 1010 | 1.5 parts |

Comparative Example 7

T-1 was removed from the formulation of Example 1. That is, ink formulation was as follows:

| C.I. Solvent Yellow 162 | 1.5 parts |
|---|---|
| SUNMIDE 550 | 12 parts |
| CLEARON P115 | 5 parts |
| NIKKAMIDE SE | 80 parts |
| IRGANOX 1010 | 1.5 parts |

Comparative Example 8

NIKKAMIDE SE 550 was removed from the formulation of Example 1. That is, ink formulation was as follows:

| C.I. Solvent Yellow 162 | 1.5 parts |
|---|---|
| SUNMIDE 550 | 12 parts |
| CLEARON P115 | 5 parts |
| T-1 | 80 parts |
| IRGANOX 1010 | 1.5 parts |

The inks of Examples 1 to 6 and Comparative Examples 1 to 8 were each set in a hot-melt ink-jet recording apparatus in which an ink heated and liquefied in the apparatus is on-demand ejected from an ink-jet recording head to cause ink drops to adhere to recording paper, and then images were printed. Upon printing, print color, storage stability, heat resistance and light-fastness were evaluated to obtain the results as shown in Table 1. Evaluated on these items was made in the following way and under the following conditions.

(1) Print color

Images were printed on 4024 paper (available from Xerox Corporation) by all-nozzle simultaneous driving to prepare patches (solid prints with rectangular shape of several cm square), and colors of the patches were measured with a multiple-light spectral colorimeter (MSC-5N, manufactured by Suga Shikenki K.K.) to make evaluation by the L*a*b* color system according to the following criteria.

Rank: Criteria
  A: a* is −20 or less, and b* is 70 or more.
  B: a* is −15 or less, and b* is 70 or more.
  C: a* is −15 or less, and b* is 70 or less.
(2) Storage stability
  Inks prepared were each put into an oven heated to 120° C. and stored for 10 days. Thereafter, the inks were each set in the above recording apparatus, and continuous printing on 100 sheets was carried out to make evaluation according to the following criteria.
Rank: Criteria
  A: Nothing was wrong.
  B: Non-ejection or printing disorder.
(3) Heat resistance
  Samples printed in the above (2) was made into patches, and colors of the patches were measured with a multiple-light spectral colorimeter (MSC-5N, manufactured by Suga Shikenki K.K.) to make evaluation by the L*a*b* color system according to the following criteria.
Rank: Criteria
  A: ΔE is 5.0 or less.
  B: ΔE is 7.0 or less.
  C: ΔE is 10.0 or more.
(4) Light-fastness
  The patches prepared in the above (1) were exposed to ultraviolet rays of 17,500 1× in a weatherometer (manufactured by Suga Shikenki K.K.) to make a 72-hour continuous test. Thereafter, colors of the patches were measured with a multiple-light spectral colorimeter (MSC-5N, manufactured by Suga Shikenki K.K.) to make evaluation by the L*a*b* color system according to the following criteria.
Rank: Criteria
  A: ΔE is 5.0 or less.
  B: ΔE is 7.0 or less.
  C: ΔE is 10.0 or more.

TABLE 1

| Ink | (Evaluation item) | | | |
|---|---|---|---|---|
| | (1)*1 | (2)*2 | (3)*3 | (4)*4 |
| Example | | | | |
| 1 | A | A | A | B |
| 2 | A | A | B | B |
| 3 | A | A | A | A |
| 4 | A | A | A | A |
| 5 | A | A | A | A |
| 6 | A | A | A | A |
| Comparative Example: | | | | |
| 1 | A | A | C | C |
| 2 | C | C | C | C |
| 3 | C | B | C | C |
| 4 | B | B | C | C |
| 5 | A | C | A | A |
| 6 | A | A | B | C |
| 7 | A | C | C | B |
| 8 | A | C | A | B |

*1Print Color;
*2Storage Stability
*3Heat Resistance;
*4Light-fastness

As can be seen from the results shown in Table 1, the inks of Examples 1 to 6 show performance or properties substantially satisfactory in respect of all the four evaluation items of the print color hue, storage stability, heat resistance and light-fastness.

On the other hand, the ink of Comparative Example 1, in which the antioxidant is removed from the formulation of Example 1, has so poor an oxidation resistance as to result in poor heat resistance and light-fastness.

The inks of Comparative Examples 2 to 4, which make use of dyes different from the one used in Examples 1 to 6, have so poor dispersibility or solubility in the resins and waxes as to have poor hues, also resulting in poor heat resistance and light-fastness.

The inks of Comparative Examples 5 to 8, in which any one of the components (a) to (d) of the medium was not used in the ink formulation, have a poor result against at least one of the evaluation items.

As is clear from what has been described above, according to the hot-melt inks of Examples 1 to 6, they have good storage stability and print quality, have superior transparency adaptable also to printing on OHP sheets, and can form sharp colors most suited for the hot-melt ink-jet recording, all of which are attributable to the recording agent C.I. Solvent Yellow 162, having good dispersibility or solubility in the specific resins and waxes. The hot-melt inks thus formulated have good heat resistance and storage stability, and enables printing in a good adhesion, not only on plain paper but also on any recording papers such as OHP sheets.

Example 7

As the amide resin, SUNMIDE 550 (trade name, available from Sanwa Chemical Industries Co., Ltd.) was used; as the terpene resin, CLEARON P115 (trade name, available from Yasuhara Chemical Co., Ltd.); as the ketone wax, T-1 (trade name, available from Kao Corporation); as the monoamide wax, NIKKAMIDE SE (trade name, available from Nippon Kasei Chemical Co., Ltd.); and as the antioxidant, IRGANOX 1010 (trade name, available from Ciba-Geigy Corp.).

Ink formulation was as follows:

| | |
|---|---|
| C.I. Solvent Blue 70 | 1.5 parts |
| SUNMIDE 550 | 12 parts |
| CLEARON P115 | 5 parts |
| T-1 | 50 parts |
| NIKKAMIDE SE | 30 parts |
| IRGANOX 1010 | 1.5 parts |

Example 8

As the amide resin, BIRTHAMIDE 335 (trade name; available from Henkel Hakusui Corporation) was used; as the terpene resin, YS POLYSTAR T-115 (trade name, available from Yasuhara Chemical Co., Ltd.); as the ketone wax, WAX KM (trade name, available from Nippon Kasei Chemical Co., Ltd.); as the monoamide wax, NIKKAMIDE S (trade name, available from Nippon Kasei Chemical Co., Ltd.); and as the antioxidant, ADECASTAB AO-37 (trade name, available from Asahi Denka Kogyo K.K.).

Ink formulation was as follows:

| | |
|---|---|
| C.I. Solvent Blue 70 | 1.5 parts |
| BIRTHAMIDE 335 | 22 parts |
| YS POLYSTAR T115 | 5 parts |
| WAX KM | 50 parts |
| NIKKAMIDE S | 20 parts |
| ADECASTAB AO-37 | 1.5 parts |

Example 9

As a C5–C9 type synthetic petroleum resin, ALCON P115 (trade name; available from Arakawa Chemical Industries, Ltd.) was used; as the terpene resin, YS POLYSTAR T100 (trade name, available from Yasuhara Chemical Co., Ltd.); as the ketone wax, STEARON (trade name, available from Kanto Chemical Co., Inc.); as the diamide wax, BISAMIDE S (trade name, available from Nippon Kasei Chemical Co., Ltd.); and as the antioxidant, SUMILIZER BHT (trade name, available from Sumitomo Chemical Co., Ltd.

Ink formulation was as follows:

| C.I. Solvent Blue 70 | 1.5 parts |
|---|---|
| ALCON P115 | 22 parts |
| YS POLYSTAR T100 | 5 parts |
| STEARON | 52 parts |
| BISAMIDE | 18 parts |
| SUMILIZER BHT | 1.5 parts |

Example 10

As a C5–C9 type synthetic petroleum resin, ALCON P100 (trade name; available from Arakawa Chemical Industries, Ltd.) was used; as the terpene resin, YS POLYSTAR T100 (trade name, available from Yasuhara Chemical Co., Ltd.); as the paraffin wax, HNP-0190 (trade name, available from Nippon Seiro Co., Inc.); as the monoamide wax, NIKKAMIDE S (trade name, available from Nippon Kasei Chemical Co., Ltd.); and as the antioxidant, SUMILIZER BHT (trade name, available from Sumitomo Chemical Co., Ltd.

Ink formulation was as follows:

| C.I. Solvent Blue 70 | 1.5 parts |
|---|---|
| ALCON P100 | 22 parts |
| YS POLYSTAR T100 | 5 parts |
| HNP-0190 | 45 parts |
| NIKKAMIDE S | 25 parts |
| SUMILIZER BHT | 1.5 parts |

Example 11

As a C5–C9 type synthetic petroleum resin, ALCON M90 (trade name; available from Arakawa Chemical Industries, Ltd.) was used; as the terpene resin, YS POLYSTAR 2115 (trade name, available from Yasuhara Chemical Co., Ltd.); as the paraffin wax, HNP-16B (trade name, available from Nippon Seiro Co., Inc.); as the monoamide wax, NIKKAMIDE S (trade name, available from Nippon Kasei Chemical Co., Ltd.); and as the antioxidant, ADECASTAB AO-37 (trade name, available from Asahi Denka Kogyo K.K.).

Ink formulation was as follows:

| C.I. Solvent Blue 70 | 1.5 parts |
|---|---|
| ALCON M90 | 20 parts |
| YS POLYSTAR 2115 | 5 parts |
| HNP-16B | 47 parts |
| NIKKAMIDE S | 25 parts |
| ADECASTAB AO-37 | 1.5 parts |

Example 12

As a C5–C9 type synthetic petroleum resin, ALCON P115 (trade name; available from Arakawa Chemical Industries, Ltd.) was used; as the terpene resin, SR-30PX (trade name, available from Arakawa Chemical Industries, Ltd.); as the paraffin wax, PARAFFIN WAX 155 (trade name, available from Nippon Seiro Co., Inc.); as the monoamide wax, NIKKAMIDE S (trade name, available from Nippon Kasei Chemical Co., Ltd.); and as the antioxidant, ADECASTAB AO-37 (trade name, available from Asahi Denka Kogyo K.K.).

Ink formulation was as follows:

| C.I. Solvent Blue 70 | 1.5 parts |
|---|---|
| ALCON P115 | 20 parts |
| SR-30PX | 5 parts |
| PARAFFIN WAX 155 | 52 parts |
| NIKKAMIDE S | 20 parts |
| ADECASTAB AO-37 | 1.5 parts |

Comparative Example 9

As the amide resin, SUNMIDE 550 (trade name, available from Sanwa Chemical Industries Co., Ltd.) was used; as the terpene resin, CLEARON P115 (trade name, available from Yasuhara Chemical Co., Ltd.); as the ketone wax, T-1 (trade name, available from Kao Corporation); and as the monoamide wax, NIKKAMIDE SE (trade name, available from Nippon Kasei Chemical Co., Ltd.).

Ink formulation was as follows:

| C.I. Solvent Blue 70 | 1.5 parts |
|---|---|
| SUNMIDE 550 | 12 parts |
| CLEARON P115 | 5 parts |
| T-1 | 50 parts |
| NIKKAMIDE SE | 31.5 parts |

Comparative Example 10

As the dye, C.I. Solvent Blue 35 was used; as the amide resin, BIRTHAMIDE 335 (trade name; available from Henkel Hakusui Corporation); as the terpene resin, YS POLYSTAR T-115 (trade name, available from Yasuhara Chemical Co., Ltd.); as the ketone wax, WAX KM (trade name, available from Nippon Kasei Chemical Co., Ltd.); as the monoamide wax, NIKKAMIDE S (trade name, available from Nippon Kasei Chemical Co., Ltd.); and as the antioxidant, ADECASTAB AO-37 (trade name, available from Asahi Denka Kogyo K.K.).

Ink formulation was as follows:

| C.I. Solvent Blue 35 | 1.5 parts |
|---|---|
| BIRTHAMIDE 335 | 22 parts |
| YS POLYSTAR T115 | 5 parts |
| WAX KM | 50 parts |
| NIKKAMIDE S | 20 parts |
| ADECASTAB AO-37 | 1.5 parts |

Comparative Example 11

As the dye, C.I. Solvent Blue 25 was used; as a C5–C9 type synthetic petroleum resin, ALCON P115 (trade name; available from Arakawa Chemical Industries, Ltd.); as the terpene resin, YS POLYSTAR T100 (trade name, available from Yasuhara Chemical Co., Ltd.); as the ketone wax, STEARON (trade name, available from Kanto Chemical Co., Inc.); as the diamide wax, BISAMIDE S (trade name, available from Nippon Kasei Chemical Co., Ltd.); and as the antioxidant, SUMILIZER BHT (trade name, available from Sumitomo Chemical Co., Ltd.

Ink formulation was as follows:

| C.I. Solvent Blue 25 | 1.5 parts |
|---|---|
| ALCON P115 | 22 parts |
| YS POLYSTAR T100 | 5 parts |
| STEARON | 52 parts |
| BISAMIDE | 18 parts |
| SUMILIZER BHT | 1.5 parts |

The inks of Examples 7 to 12 and Comparative Examples 9 to 11 were each set in a hot-melt ink-jet recording apparatus (an ink-jet recording apparatus of the type wherein an ink heated and liquefied in the apparatus is on-demand ejected from an ink-jet recording head to cause ink drops to adhere to recording paper) and images were printed, where print color, storage stability, heat resistance and light-fastness were evaluated to obtain the results as shown in Table 2. Evaluation on these items was made in the same way and under the same conditions as in Example 1 except that the print color was evaluated according to criteria changed as shown below.

(1) Print color

Images were printed on 4024 paper (available from Xerox Corporation) by all-nozzle simultaneous driving to prepare patches (solid prints with rectangular shape of several cm square), and colors of the patches were measured with a multiple-light spectral colorimeter (MSC-5N, manufactured by Suga Shikenki K.K.) to make evaluation by the $L^*a^*b^*$ color system according to the following criteria.

Rank: Criteria
A: $a^*$ is −40 or less, and $b^*$ is 20 or less.
B: $a^*$ is −40 or more, and $b^*$ is 20 or less.
C: Printing is impossible (the dye does not dissolve)

TABLE 2

| | (Evaluation item) | | | |
|---|---|---|---|---|
| Ink | (1')*5 | (2)*2 | (3)*3 | (4)*4 |
| Example | | | | |
| 7 | A | A | A | B |
| 8 | A | A | B | B |
| 9 | A | A | A | A |
| 10 | A | A | A | A |
| 11 | A | A | A | A |
| 12 | A | A | A | A |
| Comparative Example: | | | | |
| 9 | A | A | C | C |
| 10 | B | A | B | B |
| 11 | C | — | — | — |

*5 Print Color;
*2 Storage Stability
*3 Heat Resistance;
*4 Light-fastness

As can be seen from the results shown in Table 2, the inks of Examples 7 to 12 show performance or properties substantially satisfactory in respect of all the four evaluation items of the print color hue, storage stability, heat resistance and light-fastness.

On the other hand, the ink of Comparative Example 9 has substantially the same composition as Examples 7 to 12 except that the antioxidant is absent. Hence, it has poor heat resistance and light-fastness as previously stated.

The inks of Comparative Examples 10 and 11, which make use of dyes different from the one used in Examples 7 to 12, have so poor dispersibility or solubility in the resins and waxes as to have poor hues.

As is clear from what has been described above, according to the hot-melt inks of Examples 7 to 12, they have good storage stability and print quality, have superior transparency adaptable also to printing on OHP sheets, and can form sharp colors most suited for the hot-melt ink-jet recording, all of which are attributable to the recording agent C.I. Solvent Blue 70, having good dispersibility or solubility in the specific resins and waxes. The hot-melt inks thus formulated have good heat resistance and storage stability, and enables printing in a good adhesion, not only on plain paper but also on any recording papers such as OHP sheets.

The entire disclosures of the specifications, summaries and claims of Japanese Patent Application Nos. 9-75121 and 9-75122 both filed on Mar. 27, 1997 are herein incorporated by reference.

What is claimed is:

1. (Amended) A hot-melt ink for ink-jet recording, consisting of:
   a colorant containing C.I. Solvent Yellow 162 or C.I. Solvent Blue 70;
   a medium in which the colorant is dissolved or dispersed and which contains the following components (a) to (d):
   (a) at least one resin selected from the group consisting of an amide resin, a C5 synthetic petroleum resin and a C9 synthetic petroleum resin;
   (b) at least one resin selected from the group consisting of a rosin resin, a terpene resin and a terpene phenol resin;
   (c) at least one wax selected from the group consisting of a paraffin wax, a ketone wax and a polyethylene oxide wax; and
   (d) at least one wax selected from the group consisting of a monoamide wax and a diamide wax; and
   an antioxidant.

2. The hot-melt ink according to claim 1, wherein said C.I. Solvent Yellow 162 or C.I. Solvent Blue 70 is contained in an amount of from 0.1% by weight to 15% by weight in the hot-melt ink.

3. The hot-melt ink according to claim 2, wherein said C.I. Solvent Yellow 162 or C.I. Solvent Blue 70 is contained in an amount of from 0.5% by weight to 10% by weight in the hot-melt ink.

4. The hot-melt ink according to claim 3, wherein said C.I. Solvent Yellow 162 or C.I. Solvent Blue 70 is contained in an amount of from 1% to 5% by weight in the hot-melt ink.

5. The hot-melt ink according to claim 1, wherein said component-(a) resin is contained in an amount of from 1% to 35% by weight in the hot-melt ink.

6. The hot-melt ink according to claim 5, wherein said component-(a) resin is contained in an amount of from 5% to 30% by weight in the hot-melt ink.

7. The hot-melt ink according to claim 1, wherein said component-(b) resin is contained in an amount of from 0.1% to 15% by weight in the hot-melt ink.

8. The hot-melt ink according to claim 7, wherein said component-(b) resin is contained in an amount of from 0.5% to 10% by weight in the hot-melt ink.

9. The hot-melt ink according to claim 1, wherein said component-(c) wax is contained in an amount of from 1% to 70% by weight in the hot-melt ink.

10. The hot-melt ink according to claim 9, wherein said component-(c) wax is contained in an amount of from 10% to 60% by weight in the hot-melt ink.

11. The hot-melt ink according to claim 1, wherein said component-(d) wax is contained in an amount of from 0.5% to 40% by weight in the hot-melt ink.

12. The hot-melt ink according to claim 11, wherein said component-(d) wax is contained in an amount of from 5% to 30% by weight in the hot-melt ink.

13. The hot-melt ink according to claim 1, wherein said antioxidant is contained in an amount of from 0.1% to 5% by weight in the hot-melt ink.

14. The hot-melt ink according to claim 13, wherein said antioxidant is contained in an amount of from 0.5% to 3% by weight in the hot-melt ink.

15. The hot-melt ink according to claim 1, wherein said component (a) has a weight-average molecular weight of from 500 to 500,000.

16. The hot-melt ink according to claim 15, wherein said component (a) has a weight-average molecular weight of from 600 to 400,000.

17. The hot-melt ink according to claim 16, wherein said component (a) has a weight-average molecular weight of from 700 to 300,000.

18. The hot-melt ink according to claim 1, wherein said component (b) has a weight-average molecular weight of from 500 to 500,000.

19. The hot-melt ink according to claim 18, wherein said component (b) has a weight-average molecular weight of from 600 to 400,000.

20. The hot-melt ink according to claim 19, wherein said component (b) has a weight-average molecular weight of from 700 to 300,000.

21. The hot-melt ink according to claim 1, wherein the component (c) has a melting point of from 50 to 150° C.

22. The hot-melt ink according to claim 21, wherein the component (c) has a melting point of from 60 to 140° C.

23. The hot-melt ink according to claim 22, wherein the component (c) has a melting point of from 70 to 130° C.

24. The hot-melt ink according to claim 1, wherein the component (d) has a melting point of from 50 to 150° C.

25. The hot-melt ink according to claim 24, wherein the component (d) has a melting point of from 60 to 140° C.

26. The hot-melt ink according to claim 25, wherein the component (d) has a melting point of from 70 to 130° C.

* * * * *